Nov. 27, 1928.

H. E. WUNDERLICH 1,692,882

GRAIN SHOCKER

Filed April 20, 1925

Inventor
Herbert E. Wunderlich
Alex Sagaard
Attorney

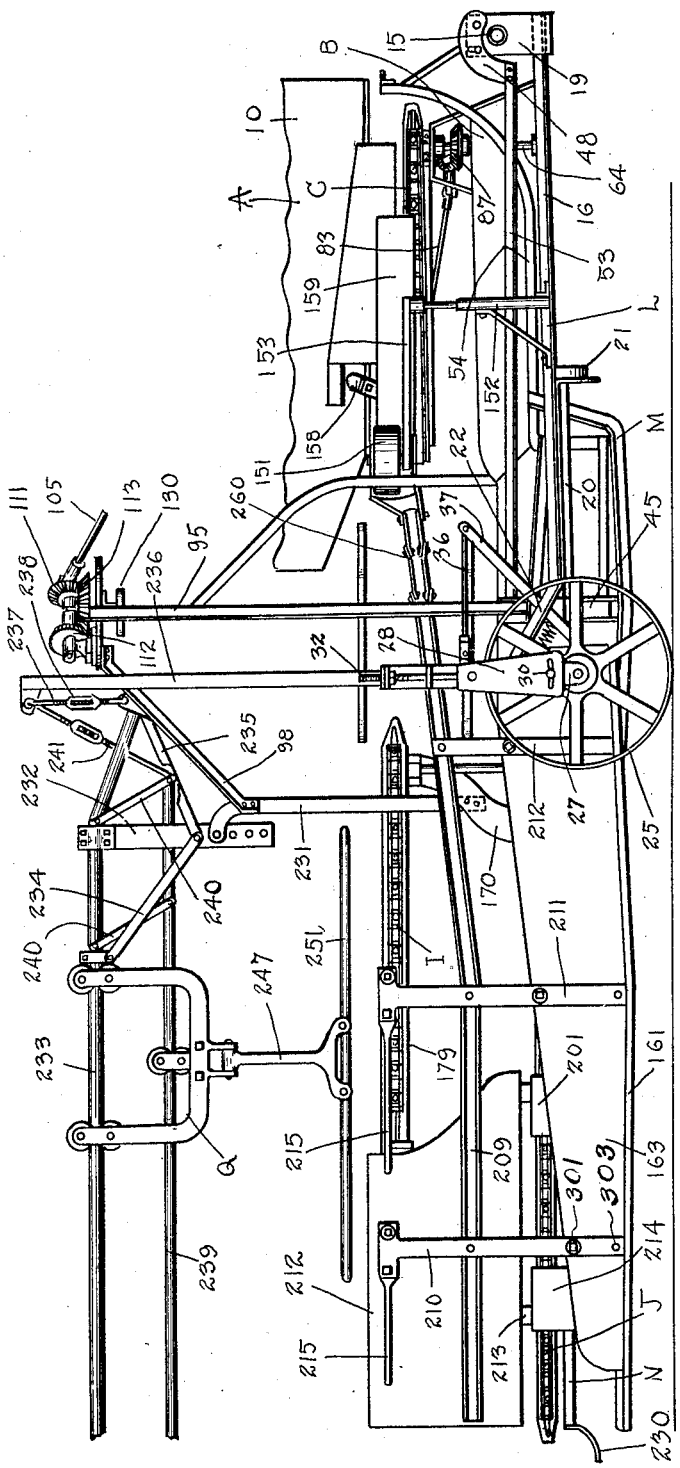

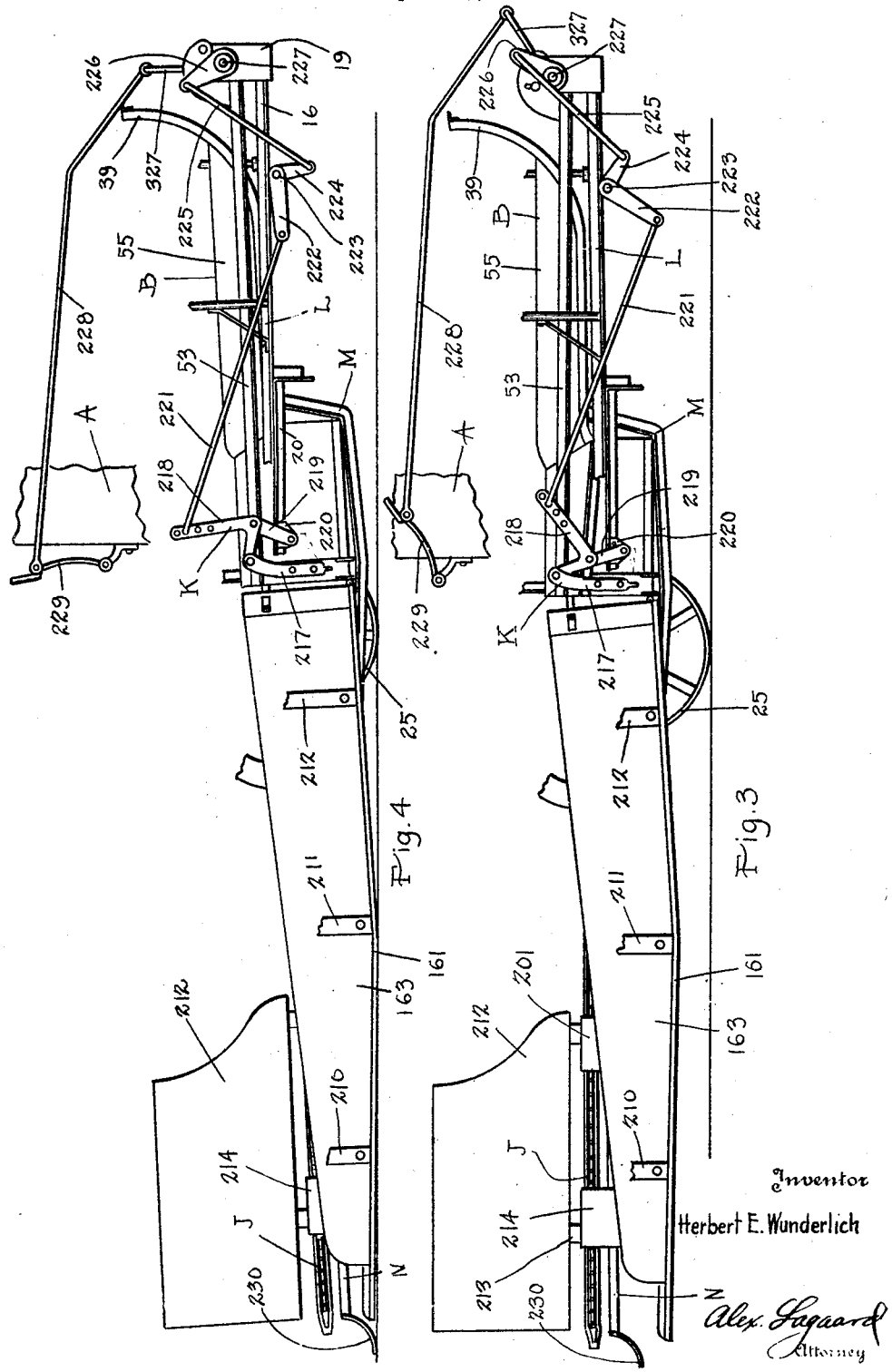

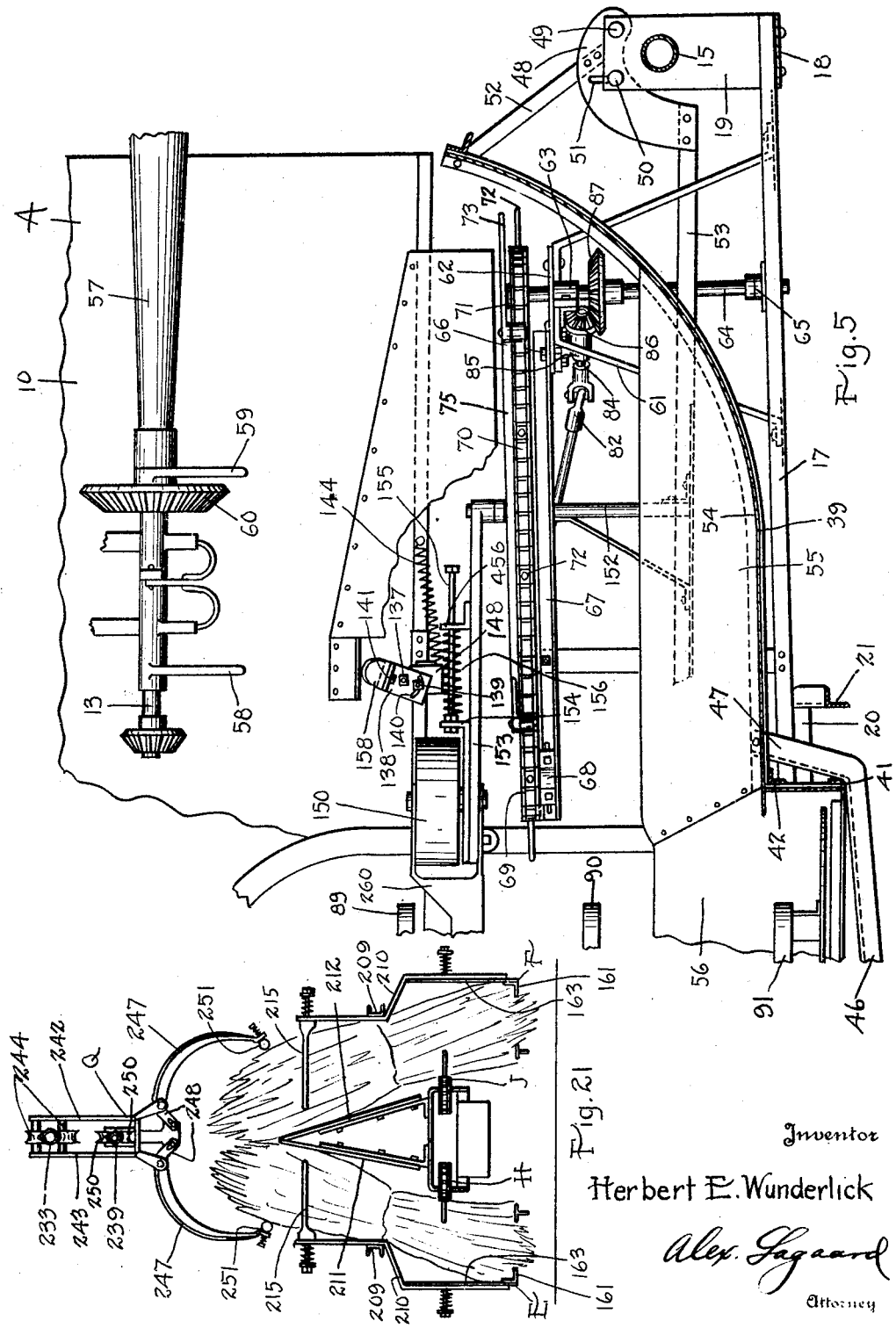

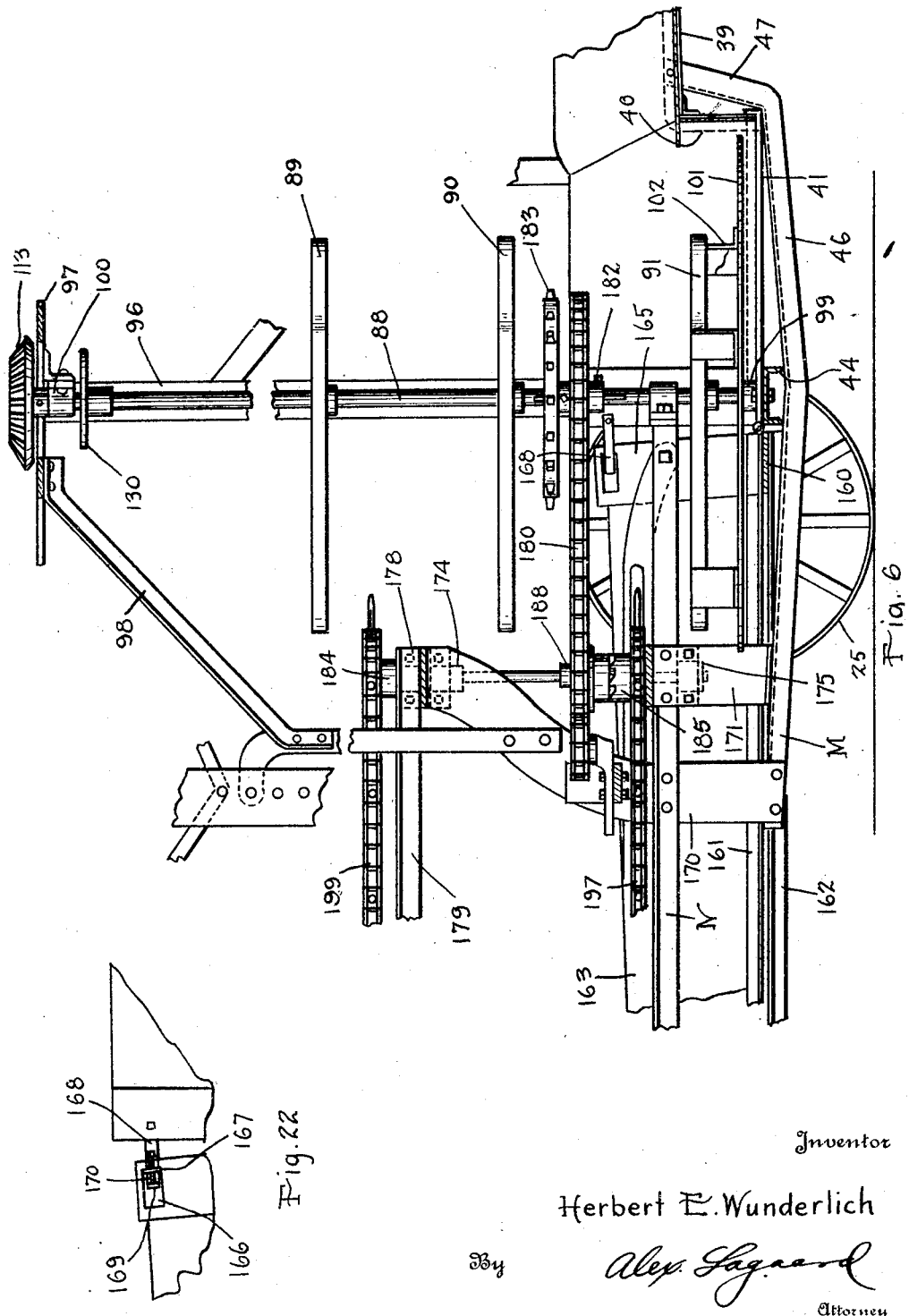

Nov. 27, 1928.  
H. E. WUNDERLICH  
GRAIN SHOCKER  
Filed April 20, 1925
1,692,882
10 Sheets-Sheet 6
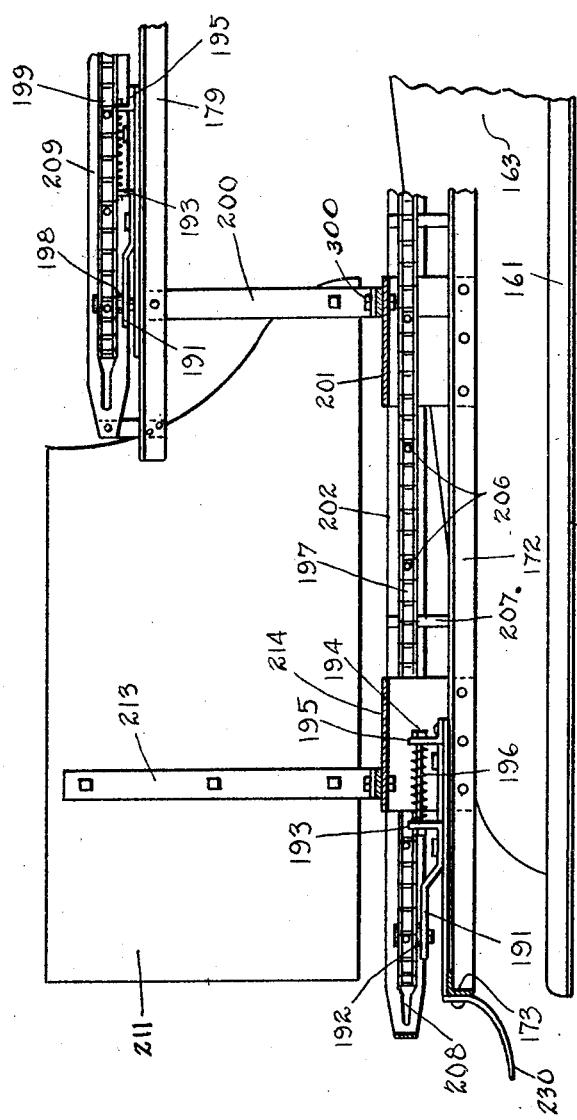
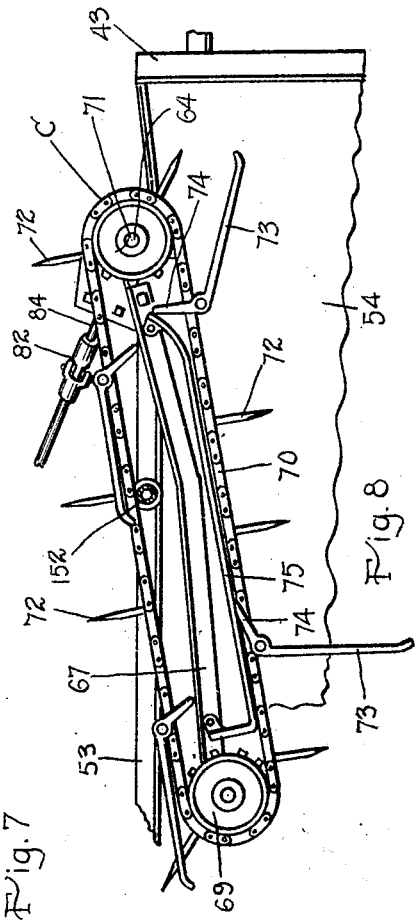
Inventor  
Herbert E. Wunderlich  
Alex Lagaard  
Attorney Nov. 27, 1928.                                                        1,692,882
H. E. WUNDERLICH
GRAIN SHOCKER
Filed April 20, 1925          10 Sheets-Sheet 7
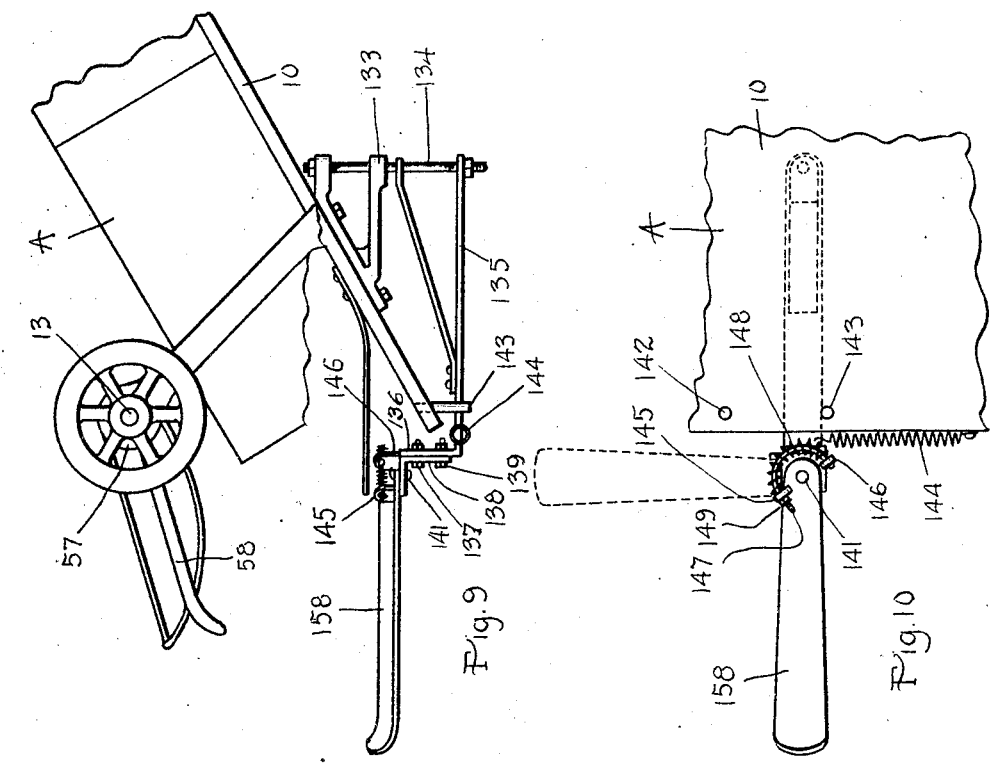
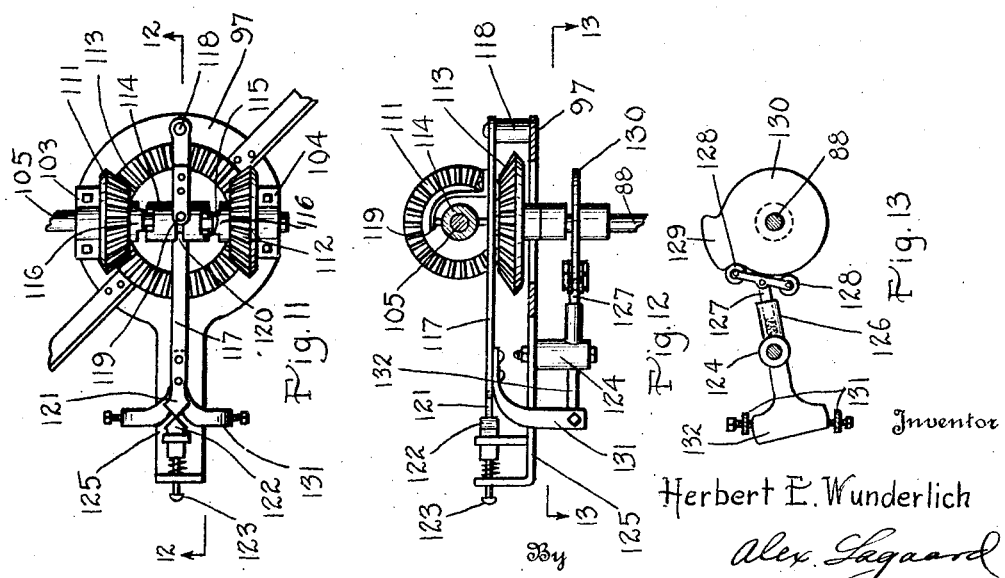
Inventor
Herbert E. Wunderlich
By Alex Sagaard
Attorney Nov. 27, 1928.

H. E. WUNDERLICH

GRAIN SHOCKER

Filed April 20, 1925

Inventor

Herbert E. Wunderlich

By Alex. Fagaard

Attorney

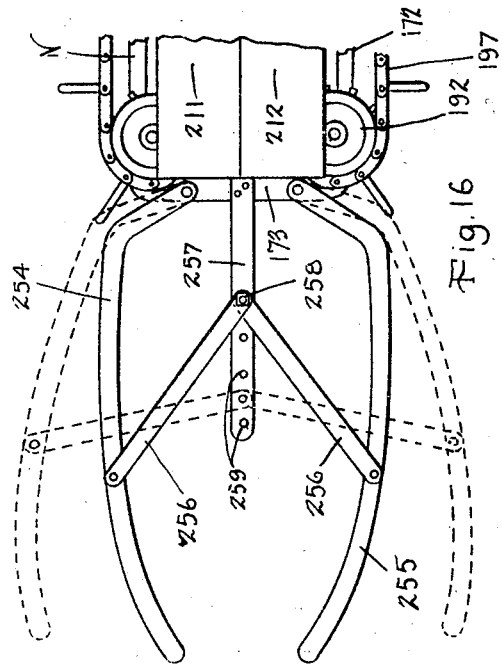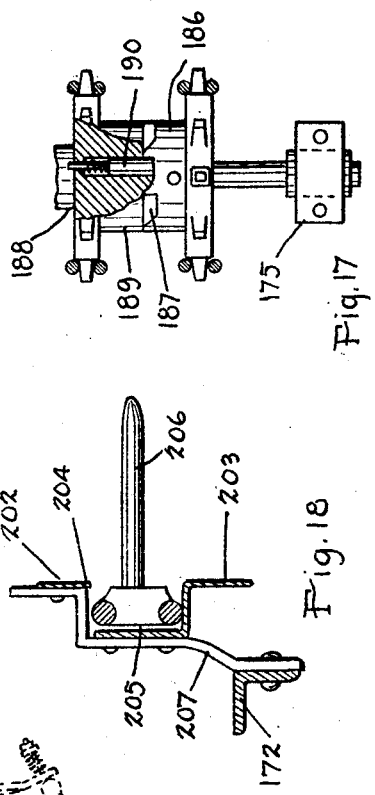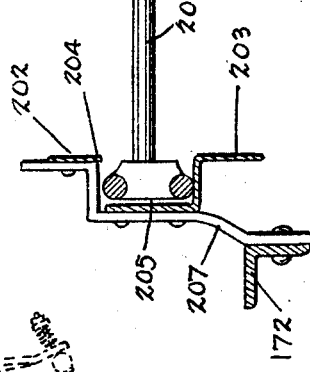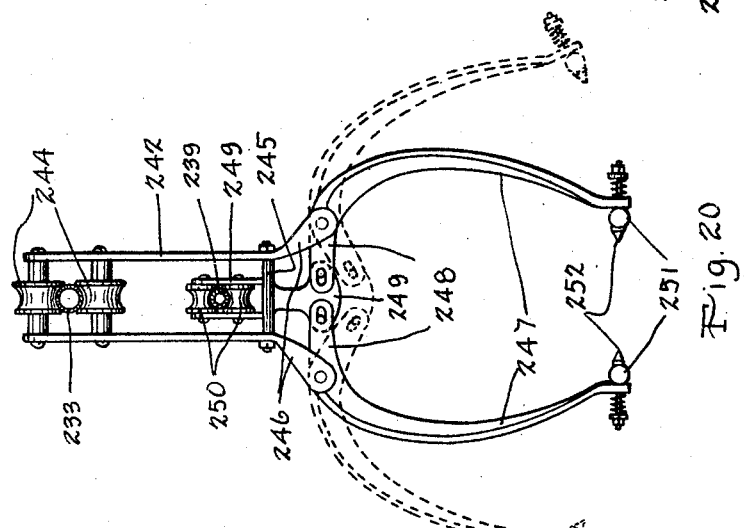

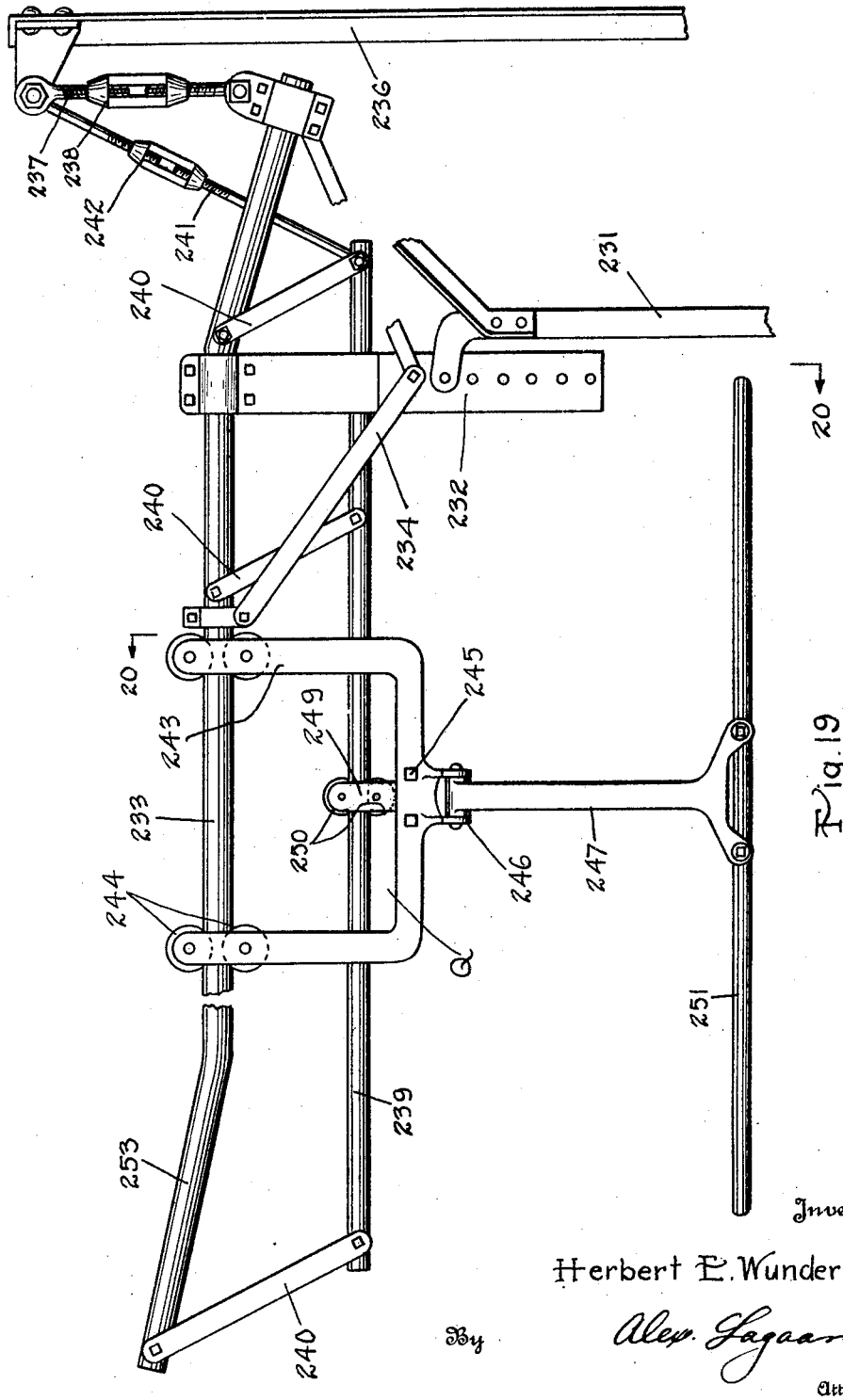

Patented Nov. 27, 1928.

1,692,882

UNITED STATES PATENT OFFICE.

HERBERT E. WUNDERLICH, OF ST. PAUL, MINNESOTA.

GRAIN SHOCKER.

Application filed April 20, 1925. Serial No. 24,462.

My invention relates to grain shockers and has for its object to provide a shocker which is adapted to be conveyed along with a grain binder and to receive the bundles as delivered by the same and to collect and discharge said bundles in shocks when desired by the operator.

Another feature of the invention resides in providing a shocker adapted to receive the bundles and form a continuous elongated shock which may be made of any length desired within the limits of the machine.

A still further object of the invention resides in providing a device in which the bundles are arranged in two rows leaning towards each other and to provide means for causing the end bundles of the two rows to lean towards the intermediate bundles.

An object of the invention resides in providing a receiver for the bundles for receiving the same as the bundle leaves the binder and to provide a device in connection therewith for raising or erecting the bundles so that upon leaving the device said bundles are in a position permitting them to be arranged in shocks.

A still further feature of the invention resides in providing a pair of carriers lying adjacent one another in which the two rows of bundles are positioned which carriers are spaced at the bottom to cause the bundles in the two rows to lean towards each other.

A further object resides in providing a distributor into which the bundles pass upon leaving the receiver, which distributor is adapted to alternately deliver the bundles to said carriers and form the double row of bundles previously specified.

Further objects of the invention reside in arranging conveyors within said receiver and along said carriers for conveying the bundles to said distributor and for progressively moving the bundles along said carriers as the shock is formed. It is also a feature of the invention to employ an upper and a lower conveyor belt along the carriers and to run the upper belt at a greater rate of speed than the lower belt and to extend the lower belt beyond the end of the upper belt, so that the end bundles in each row lean both at the front and rear towards the intermediate bundles.

A still further object of the invention resides in providing means whereby the carriers may be lowered to allow the formed shock to engage the ground permitting the carriers to be withdrawn therefrom as the binder and shocker travel along, and to further provide means for temporarily holding the shock together while the same is being removed from the machine.

Other features of the invention reside in the specific construction and other features of the same, disclosed in the annexed specification, claims and drawings forming a part of this application.

In the drawings illustrating my invention in one form:

Fig. 2 is a side elevational view of the machine shown in Fig. 1.

Fig. 3 is a view similar to Fig. 2 with a supporting wheel and other portions of the invention omitted to illustrate the dump mechanism and show the carriers in elevated position.

Fig. 4 is a view similar to Fig. 3 illustrating the carriers in their lowered position.

Fig. 5 is an enlarged sectonal view thru the receiver taken on line 5—5 of Fig. 1.

Fig. 6 is an enlarged sectional view thru the distributor taken on line 6—6 of Fig. 1.

Fig. 7 is an enlarged sectional view taken on line 7—7 of Fig. 1.

Fig. 8 is a plan view of the conveyor shown in Fig. 5.

Fig. 9 is an elevational view of a portion of the front of the binder showing the mechanism for erecting the bundles attached thereto.

Fig. 10 is a plan view of the structure shown in Fig. 9.

Fig. 11 is a plan view of the driving mechanism for the distributor.

Fig. 12 is an elevational sectional view taken on line 12—12 of Fig. 11.

Fig. 13 is a plan sectional view taken on line 13—13 of Fig. 12.

Fig. 16 is a plan view of the rear end of the machine showing an attachment mounted thereon for use in spreading the butts of the bundles when long grain is being cut.

Fig. 17 is an enlarged detail view of the clutch mechanism for driving the carrier conveyors.

Fig. 18 is an enlarged sectional view of one of the chains of the carrier conveyor illustrating the guide and support for the same.

Fig. 19 is a side elevational view of the device for holding the bundles in place while the shock is being dumped.

Fig. 20 is a sectional view of the machine taken on line 20—20 of Fig. 19.

Fig. 21 is a rear end view of the machine.

Fig. 22 is an enlarged detail view of the carrier supports of the invention.

Figure 1:
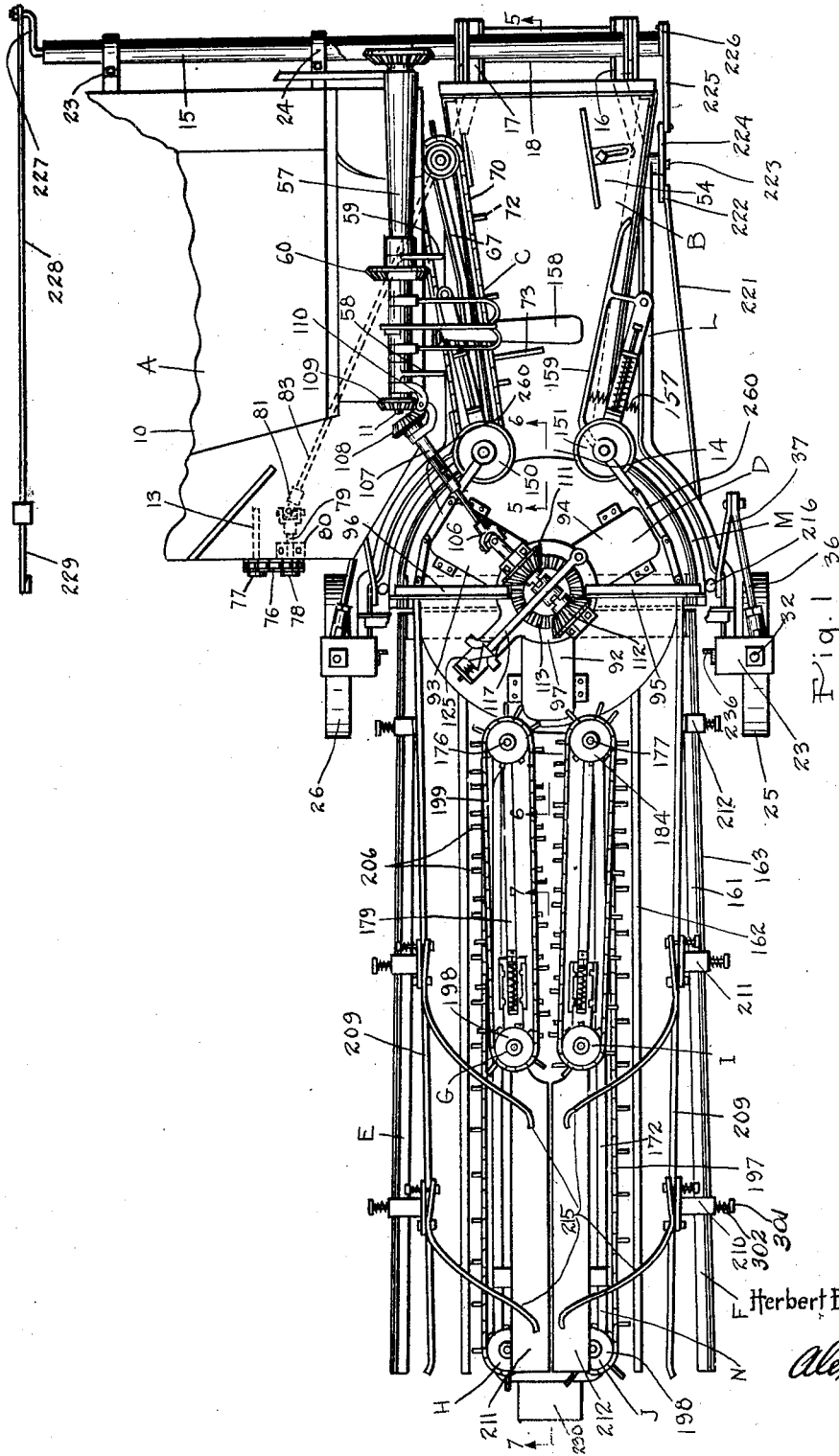
Fig. 1 is a plan view of my improved shocker showing the same attached to a binder with portions thereof removed to most advantageously illustrate the invention.

In conjunction with the harvesting of grain it is essential that the bundles delivered from the binder be shocked so that injury will not come to the grain while the same remains in the field prior to threshing.

My invention provides a device by means of which the bundles are automatically shocked as the binder travels along, thereby eliminating the employment of additional labor for shocking and at the same time having the grain shocked immediately after it is cut. The exact construction of my invention by means of which these results are to be obtained is herewith described in detail.

As before stated, my invention is used in conjunction with a binder and travels along with it, receiving the bundles discharged from the binder and arranging them in shocks and discharging the same upon the ground. For this reason a portion of a binder which is indicated at A has been illustrated, but due to the fact that such machines are well known in the art, the same is only shown in part and without detail to any great extent. In the drawings I have shown merely the bundle forming table 10, the throw out shaft 11 together with the mechanism carried and operated thereby and a portion of the packer shaft 13. The direct application of these parts as well as others to be later enumerated to my invention will appear from the following description thereof.

My invention proper comprises a receiver B in which the bundles discharged from the binder A fall and in which by appropriate mechanism the bundles are righted or stood on end so as to be in a position from which the same may be readily arranged in shocks. Within the receiver is positioned a conveyor C by which the bundles in erected position are moved to a throat 14 forming the discharge of the receiver B. From this throat the bundles are discharged and are engaged by a distributor D which delivers them to two carriers E and F arranged in parallel spaced relation and on which the shocks are formed. Conveyors G, H, I and J advance the bundles along said carriers thus forming the shock as the binder progresses. Upon completion of a shock the operator manipulates a dump mechanism which lowers the carriers E and F until the bundle butts engage the ground thereby permitting said carriers to be withdrawn as the machine moves along and leaving a properly formed shock upon the ground.

The entire machine is carried on a wheel supported frame "L", which is pivoted to a tubular support 15 attached to the binder proper A. The distributor D and receiver B are both mounted on another frame M, which in turn is pivoted at one end to the frame L near its point of attachment to the tube 15 and at its other end is connected to said frame L by the dump mechanism K previously mentioned. An extension N of the frame M carries the conveyors G, H, I and J while the carriers E and F are hingedly connected to the frame M at the end thereof and are adapted to move with it, when the same is lowered and also to move relative to the frame N for a purpose to be later described.

The frame L is best illustrated in Figs. 1, 2, 14 and 15. It consists of two longitudinal frame members 16 and 17, which are riveted to two upstanding ears 19 formed on a cross bar 18. These frame members are at their other ends riveted to a U-shaped frame member 20, which is formed with a transverse portion 21 dropped below the major portion of the frame to form a cradle allowing the frame M which is positioned within frame L to drop as the shock is being released or dumped. The rear ends 22 of the longitudinal frame members 16 and 17 are bent upwardly and both these ends and the rearward ends of the frame member 20 are riveted to uprights 23 shown in detail in Figs. 14 and 15.

The frame L is supported at one end on the tubular support 15 which passes thru the ears 19 on bar 18, thereby pivotally supporting the same. Tube 15 is securely attached to the framework of the binder A by means of a number of clamps 23 and 24, or in any suitable manner and extends outwardly to support the shocker and to tow the same along as the binder progresses.

Figure 14:
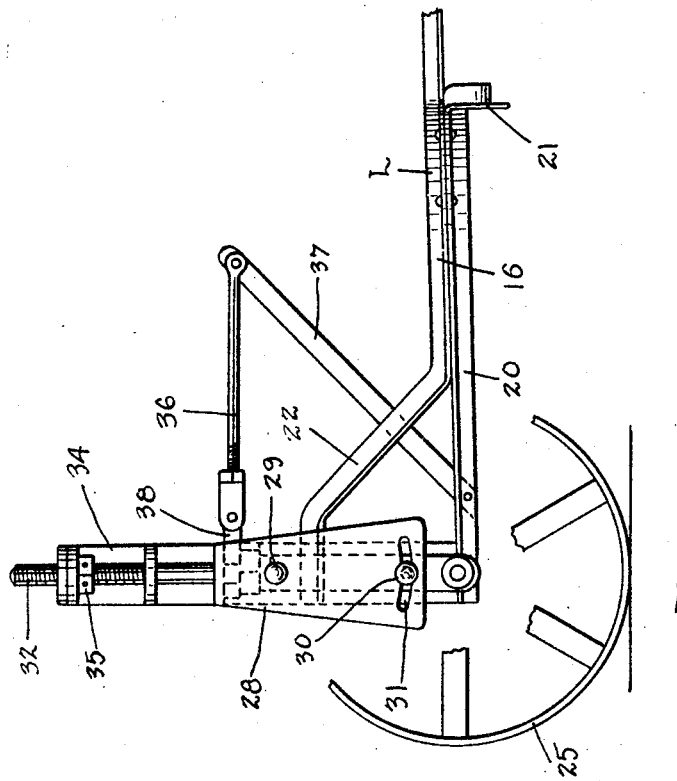
Fig. 14 is a fragmentary side elevational view of a portion of the shocker illustrating the wheel support.
Figure 15:
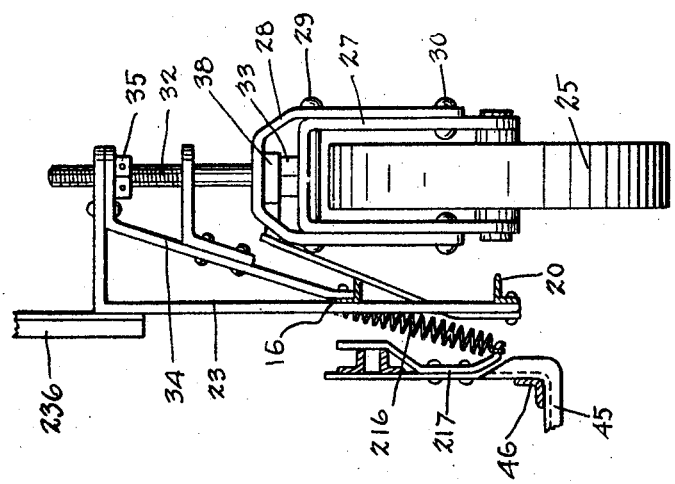
Fig. 15 is a fragmentary end elevational view of the structure shown in Fig. 14.

The other end of frame L is adjustably supported upon supporting wheels 25 and 26, which construction is illustrated in detail in Figs. 14 and 15. Since the method of supporting the frame L is the same at both wheels the construction at wheel 25 will be described in detail. A fork 27 passes around wheel 25 to which it is journalled for rotation. This fork is positioned within a yoke 28 and is pivoted to it by means of a pin 29 passing thru the upper portions of both of these numbers. Two pins 30 are secured to the lower end of fork 27 and operate in two arcuate slots 31 formed in the lowermost portions of the two sides of yoke 28, thereby limiting the oscillation of said fork and wheel relative to the yoke. Thru the upper part of the yoke 28 passes a king bolt 32 which is formed with a head 33 adapted to rest directly upon the fork 27. The king bolt 32 is mounted in a bracket 34 which is attached to and forms part of the upright 23 and is adjustably held in place by means of a nut 35 screwable upon the end of the same. In this manner the frame L is directly supported thru the uprights 23, brackets 34, the nuts 35 and king bolt 32 upon the forks 27 journalling the wheels 25 and 26. With this arrangement the wheels may turn upon the king bolts so as to follow the binder when it is turning corners which is highly desirable in this type of device. To take up the thrusts imparted to each of these wheels a round rod 36 is employed which is pivoted at one end to a bracket 37 attached to the frame L and adjustably connected at its other end to a device 38 pivoted to said king bolt 32. This device stiffens the connection of the king bolt 32 to the frame proper and receives the thrust imparted to the same as the device operates.

The frame M consists of two longitudinal frame members 39 which are bent downwardly at 40 and secured at their lower ends to a semicircular ring 41 best shown in Fig. 6. These frame members 39 are spaced from one another and are gradually curved upwardly as shown in Fig. 5 at their other ends. Two angles 42 and 43 serve to hold the same in proper relation. Across the ring 41 is placed a channel member 44 which has both of its ends 45 bent upwardly as disclosed in Fig. 2. Below said channel and the ring 41 are positioned two angles 46 which are attached thereto and are bent upwardly at 47 where they are attached to the members 39 previously referred to. These frame members extend rearwardly of the channel 44 and form the supports for the conveyors G, H, I and J, as will be presently described.

For supporting the forward end of the frame M, I employ two crescent shaped plates 48 which are pivoted to the ears 19 of bar 18 at 49. These plates are held flat upon the ears 19 by means of rivets 50 which pass thru slotted holes 51 in said plates and are attached to said ears. Longitudinal braces 53 are secured to the plates 48, and are also attached to the frame members 39, as well as the upturned ends 45 of angle 44, thereby rigidly securing the frame M to the said plates so that said frame becomes pivoted to the frame L near the support 15. In addition braces 52 serve to rigidly hold the upper ends of the frame members 39 attached to the plates 48 so that a substantial and rigid construction is provided.

The receiver B is constructed upon the frame members 39 by attaching thereto a sheet iron bottom 54 together with sheet iron sides 55, running the entire length of said frame members and being attached to the braces 53 as well. These sides connect with two arcuate sides 56 attached to the ring 41 together form the guides for the bundles as they are conducted thru the machine.

As before stated the binder A has only been shown fragmentary, the operation and construction being well known in the art. The shaft 13 which is mounted on a support 57, carries and operates a knotting mechanism 60 and has attached to it throw out fingers 58 and 59, which release and discharge the bundles in the usual manner after the same have been formed, which slide along the table 10 and drop off at the edge thereof. It will be noted that the edge of this table is arranged along the edge of the receiver B so that as the bundles are discharged they fall into the same. In the usual type of binder, the bundles leave the table with their butts pointing forwardly. As they leave the same said bundles slide out over on a swinging arm 158 which engages them rearwardly of their centers, their butt ends falling downwardly and engaging the curved receiver bottom 54, which tends to straighten up the bundle and cause it to stand in erect position.

For causing the bundle to move along the receiver B, the conveyor C is employed which is best illustrated in Figs. 5 and 8. An A-frame 61 secured to the frame member 17 has secured to it at the top a plate 62 which carries a bearing 63. A vertical shaft 64 is journalled in the bearing 63 and in another bearing 65 attached to said frame member 17. Upon the top of plate 62 is pivoted at 66 a bent angle iron arm 67 which is adapted to swing thereon and which has adjustably secured to its outer end a bearing 68, journalling a sprocket wheel 69. A link belt 70 passes around this sprocket and another sprocket wheel 71 secured to the end of the shaft 64. A number of prongs 72 are secured to chain 70 at intervals and serve to engage into the bundles to convey the same along. In addition to these prongs are employed swinging fingers 73 which are pivoted to the links of the chain 70 and are positioned in between the prongs 72. These fingers operate in conjunction with the prongs 72 to prevent the bundles from falling backward and aid in positively feeding the same forwardly. These fingers normally lie in the plane of the chain 70, as shown on the reverse side of the same in Fig. 8. When the same however reach a point just after passing sprocket 71, a cam arm 74 formed on the same engages a fixed elongated cam 75, attached to the angle arm 67, which causes the said fingers to be thrown outwardly in front of the bundles as previously described and to remain so until the bundles leave the end of the conveyor.

The conveyor C is driven from the packer shaft 13 of the binder A, as best shown in Fig. 1. A chain 76 passing over a sprocket 77 on the end of said packer shaft, drives a sprocket 78 secured to a counter shaft 79 journalled in a bearing 80 which is secured to the binder A. This shaft is coupled by means of two universal joints 81 and 82 and a floating shaft 83 with a shaft 84 journalled in a bearing 85 fast on the plate 62. A bevel gear 86 secured to this shaft meshes with a corresponding gear 87 fast on the shaft, 64. In this manner the shaft 64 and the conveyor C connected therewith are driven as the binder A is advanced.

The arm 158 is shown in detail in Figs. 9 and 10. A support 133 is attached to the under side of the table 10 and has journalled in it a depending shaft 134. This shaft has attached to it an outwardly extending arm 135 which protrudes beyond the end of the table 10 and is formed with an upwardly bent portion 136. At the upper end of this member is pivoted at 137 an angle 138 which is adapted to swing about a horizontal axis. This angle may be held in position by means of a bolt 139 which passes thru an arcuate slot 140 in said angle. To the horizontal leg of angle 138 is pivoted the arm 158 previously referred to, by means of a bolt 141, permitting the same to swing in a rearwardly upwardly inclined plane.

As the bundles fall on the arm said bundles swing thereon, the butts following the curve of the bottom 54. Arm 158 is free from movement until the bundle becomes very nearly erect, after which the same is caused to swing to the position shown in dotted lines in Fig. 10, permitting the bundle to pass as the conveyor C moves the same along the receiver B.

The arm 135 is mounted in swinging relation to the machine proper so as not to obstruct the movement of the conveyor C before the bundle becomes righted, and operates between two stops 142 and 143 secured to the table 10. A coil spring 144 serves to return said arm to its forward position.

The arm 158 normally extends outwardly as shown and is returned from its retracted position as follows: Extending upwardly from the arm 158 is a lug 145. A similar lug 146 extends upwardly from the angle plate 138. These lugs are spaced the same distance from the center 141. An arcuate rod 147 is secured to the lug 146 and passes freely thru the lug 145, permitting arm 158 to swing without obstruction. Upon the rod is positioned a coil spring 148 which presses against these two lugs, thereby holding said arm in the desired position. A nut 149 upon the end of said rod serves as a stop to limit the movement of the arm 158. With this arrangement it can readily be comprehended that the bundles are righted and upon so becoming righted are subsequently permitted to pass and discharged into the distributor D.

The distributor D is illustrated in Fig. 6. This feature of the invention consists primarily of a vertically positioned shaft 88 which carries three spaced members 89, 90, and 91 each of which is formed with three superimposed radial spokes 92, 93 and 94, between which the bundles are delivered from the conveyor C. A circular disc 101 positioned somewhat below the member 91 is attached to it by means of legs or stands 102 and serves to form a support for the butts of the bundles as the same are discharged into the distributor. When the shaft 8 is given two thirds of a revolution in either direction, the newly received bundle is carried around with it, riding along the arcuate sides 56 until it is delivered to either of the carriers E or F, as the case may be, where the conveyors G, H, I, J engage the same and cause said bundle to travel along therewith.

The shaft 88 is supported and journalled as follows. Two uprights 95 and 96 are secured to the upwardly extending ends 45 of the channel iron member 44. These uprights are bent over at the top and are attached to a plate 97 which is braced by braces 98 connected to said plate and extending to other portions of the machine to be later described. Upon the under side of the plate 97, and upon the upper side of the channel member 44 are secured bearings 99 and 100 in which the said shaft is journalled, said shaft being arranged concentrically with the arcuate sides 56.

Shaft 88 is driven by a mechanism shown in detail in Figs. 11, 12 and 13. Two bearings 103 and 104 are secured to plate 97 and journal a shaft 105 extending transversely across shaft 88. This shaft is connected by a universal joint 106 to a telescoping shaft 107, which has attached to it a bevel gear 108 meshing with a corresponding bevel gear 109 on the throw out shaft 11 of the binder proper. A hinged yoke 110 connects these shafts and holds the same journalled so that they may swing slightly relative to one another. In this manner shaft 105 is given a rotation in the same direction every time the throwout shaft 11 operates. Rotatively mounted upon the shaft 105 are two bevel pinions, 111 and 112 which mesh with a bevel gear 113 secured to the end of shaft 88. A shift collar 114 splined to shaft 105 has jaws 115 on it which mesh with corresponding jaws 116 on the gears 111, and 112 thereby serving to drive the shaft 88 in either direction depending upon the relative engagement of the respective jaws of the gears 111, and 112 and the shift collar 114.

The collar 114 is manipulated by a lever 117 pivoted to the plate 97 at 118. This lever passes between the gear 113 and the shaft 105 and is formed with a fork 119 engaging within a slot 120 in collar 114. As the said lever swings from side to side the shaft 88 is caused to reverse its rotation. The end of lever 117 is formed with a diamond shaped head 121 adapted to engage a similar diamond head 122 on a spring held plunger 123 slidably mounted on an extension 125 of plate 97. With this arrangement as soon as the arm 117 passes dead center, it flops to the opposite side causing the jaw clutch to become quickly engaged. At the same time it positively causes either one clutch or the other to remain in engagement all the time so that upon the rotation of the throw-out shaft of the binder the shaft 88 is caused to travel in either one direction or the other.

Lever 117 is operated by an arm 124 pivoted to the extension 125 of plate 97. This arm has a socket 126 in one end in which is slidably mounted a spring held spindle 127. A cross arm pivoted to the spindle 127 carries two grooved rollers 128 which are adapted to engage along the edge of a cam 130 secured to shaft 88 which cam is formed with a lug 129 extending outwardly from it on one side thereof as shown in Fig. 13. A fork 131 secured to lever 117 engages the end 132 of arm 124 by means of which the oscillatory movement of said arm is transmitted to the lever.

In operation, upon the movement of shaft 11 of the binder a bundle is discharged which is delivered to the conveyor C. This device operating continuously as long as the machine is moving immediately commences to forward the same. At the same time shaft 88 is given a two third revolution which causes the bundle last deposited therein to be discharged to one or the other of the carriers E and F. The distributer D then comes to rest before the next bundle last discharged by the binder arrives at the throat 14 so that the same is empty and in proper position to receive said bundle. As soon as the bundle has been delivered into the receiver it so remains until the next bundle is discharged from the binder. It is to be noted that the gear ratio of the gears driving the shaft 88 is such that said shaft just makes its two thirds revolution and reverses, being set for the next operation, during the complete cycle of movement of the shaft 11.

For guiding the bundles thru the throat 14 and feeding them into the distributer D, I employ two rollers 150 and 151, best illustrated in Figs. 1 and 5. The mounting of roller 150 is shown in detail in Fig. 5. An upright 152 attached to the frame member 53 extends thru the conveyor chain 70 and above the same where it has mounted on it a swinging arm 153 extending out towards the throat 14. Upon the arm is slidably positioned a support 154 which journals the roller 150. A rod 155 is attached to this support and passes freely thru a bracket 456 secured to the arm 153. By means of a compression coil spring 156 the said support and roller 150 are normally held in a position remote from the upright 152. This permits the roller to swing upon the pivot afforded by support 152 as well as to slide relatively thereto. A compression coil spring not shown serves to hold the arm 153 inwardly.

The roller 151 is mounted in a similar manner to roller 150. In addition a guide 159 is provided which is attached to the arm 153 and serves to keep the bundles in proper position within the receiver C and to direct them towards the outer periphery of the said roller 151. The spring for forcing roller 151 inwardly is indicated at 157 in Fig. 1.

The bundles upon leaving the distributer D are alternately discharged upon the two carriers E and F. These carriers are constructed and mounted as follows: A bar 160 extending across the machine is hingedly connected to the channel frame member 44, and is of a width substantially equal thereto. This bar has riveted to it at each end an angle iron rail 161 which extends rearwardly along the entire length of the machine. Parallel to each of these rails is a T iron rail 162 which is spaced from the corresponding angle iron rail. The bundles upon leaving the distributer D are deposited directly upon these pairs of rails and the shocks are formed thereon. The outer rails 161 have attached to them sides 163 which holds the butts of the bundles within the machine and aid in guiding them along the carriers E and F as the same are formed into shocks and subsequently dumped.

The carriers E and F are supported as shown in detail in Fig. 22. The plate 160 is bent up along the sides 163 at 165 and securely attached thereto. Near the upper portions of the same, said plates are formed with opening 166, the metal of which has been bent outwardly to provide ears 167. Bars 168 attached to the upright portions 45 of the channel frame member 44 have ears 169 on them and which extend thru the holes 166 opposite the ears. Screwed into the ears 167 are set screws 170 which engage the ears 169 and hold the carriers E and F in adjusted position.

Extending rearwardly from the frame M is the extension N previously referred to. This frame extension is shown in Figs. 6 and 7. At the end of the frame member 46 of frame M are attached and rigidly secured to it two U shaped uprights 170 and 171. These uprights have secured to them a distance above the frame members 46 two longitudinal frame members 172 which are joined together at their outer ends by means of a transverse frame member 173. The members 172 are spaced a distance apart so that said members fall between the inner T iron rails 162 of the carriers E and F. This frame M carries the conveyors G, H, I and J as well as other portions of the invention.

An inspection of Fig. 6 will make clear the construction and mounting of the conveyors G, H, I and J. It will be noted that the upright 170 attached rearwardly of the upright 171 is bent forwardly so that at the top extends above the upright 171. To these uprights are attached bearings 174 and 175 in which are journalled two upright shafts 176 and 177 arranged parallel to one another. Resting on the top of support 170 are two bearings 178 which are journalled on the shafts 176 and 177 and which have angles 179 secured to them which extend rearwardly of the device and form the support for the rearward sprockets of conveyors G and I.

Attached to the shafts 176 and 177 are sprockets 184 and 185 which form the driving sprockets of the conveyors G, H, I.

The sprockets 185 are constructed as shown in detail in Fig. 17, being formed with upwardly facing hubs 186 having ratchet teeth 187 thereon.

Upon the same shaft and immediately above the sprockets 185 are rotatably mounted on said shafts driving sprockets 188 which have hubs 189 formed thereon and resting on the hubs 186. In these hubs are slidably positioned spring held pins 190 which engage the ratchet teeth 187 and cause the said shafts 176 and 177 to be driven in one direction only. The sprockets 188 are driven by a chain 180 which passes about both of said sprockets and another sprocket 182 secured to the shaft 88. The ratchet teeth 187 on the gears 186 are so arranged that the particular conveyor adjacent to the carrier about to receive a bundle is operated upon rotation of the shaft 88 of distributer D so that the bundles thereon are moved along to give place for the new bundle to be delivered thereto.

The conveyors H and J are best illustrated in Fig. 7. Each of these conveyors being similarly constructed, only conveyor H will be described in detail. A bracket 191 is slidably mounted on the frame member 172. This bracket rotatably supports a sprocket wheel 192 and is formed with an upstanding ear 193 to which is rigidly secured a rod 194. Said rod passes freely thru a stop 195, fast on the frame 172 and has a spring 196 on it which is seated between ear 193 and stop 195 to force said sprocket 192 outwardly from the machine. The sprocket 192 is positioned in alignment with the sprocket 186 and a chain 197 passes about both sprockets. Upon this chain are arranged outwardly extending prongs 206 which engage the bundles as they are discharged on the carriers E and F and move the same along said carriers.

The conveyors G and I are similarly constructed to the conveyor H, using sprocket 198 instead of the sprocket 192. The bracket 191 therefore and the stop 195 are in this case mounted upon the angle iron 179, the adjustment of said sprocket being in this case as for sprocket 192. A chain 199 similar to the chain 197 passes over the sprocket 198 and the sprocket 184 which sprockets are in alignment.

The free ends of the arms 179 are supported upon standards 200 which are adjustably mounted upon a saddle 201 through bolts 300 secured to the frame M. By this means the outer ends of the conveyors G and I may be brought together or spread apart as desired.

To guide the exterior of the bundles as the same pass around the distributer D, I provide two linked guide members 260 which are pivoted to the axes of the rollers 150 and 151 at one end and at their other ends to the pressers 209. In this manner the continuity of the guides formed by the members 159, 260 and 209 is not interrupted regardless of the adjustment of the rollers 150 and 151 or the pressers 209.

Each of the chains 197 passes thru a guide 202 which is attached to the frame N. This guide is shown in detail in Fig. 18. This guide comprises a Z-shaped member 203 and a plate like member 204 positioned above the same and forming in conjunction a recess 205 in which the chain 197 is positioned. This recess is open at the front allowing the prongs 206 to project therethru. At intervals thruout the length of guide 202 the same is provided with fasteners 207 which hold the members 203 and 204 together and support the same upon the frame, N. It will be noted that the said guide 202 extends outwardly beyond the ends of the chains, the purpose of which being to cause the prongs 206 to disengage from the bundles as the same leave the machine. The ends of these guides are provided with openings 208 thru which said prongs may pass as the belt passes around the sprockets. Similar guides 209 are provided for conveyors G, I, and C.

The forming of the shock takes place upon the carriers E and F. As the bundles leave the distributer D they are discharged alternately to the respective carriers E and F where they are engaged by the prongs 206 of the conveyors G, H, I and J and moved along said carriers. A particular feature of the invention resides in designing the speed ratios of the various conveyors so that the upper conveyors G and I travel faster than the lower conveyors H and J. This causes the bundle to lean towards the center of the machine, since the tops of the same are caused to move along more rapidly than the butts. It will be noted that the conveyors G and I terminate at the middle of the carriers E and F. From thereon the bundles are moved along only by engagement with the butts. By employing retarding means engaging the tops of the bundles to be presently described the same are held back, while the butts are moved along which again causes the bundles to lean towards the center.

Along the carriers E and F are arranged pressers 209 which consist of channels positioned towards the tops of the bundles and extending along the entire length of said carriers. These pressers are supported on spring supports 210, 211, and 212 which are yieldingly held attached to the sides 163 of the carriers E and F as follows: Rivets 303 loosely attach the lower portions of the supports 210, 211 and 212 to the sides 163 while bolts 301 pass thru said supports and beyond the same above the rivets 303 and have spring 302 on them which engage said supports to force them inwardly. These pressers engage the tops of the bundles and force the same together making the bundles lean towards one another as the same are deposited on said carriers. It will be noted in Fig. 1, that the conveyors G and I approach each other so as to bring the bundles closer together as the same move along the machine.

To support the bundles between the two rows thereof at a position rearward of the conveyors E and F two inclined boards 211 and 212 are provided, best shown in Figs. 7 and 21. These boards are supported on the uprights 200 supporting the rearward ends of conveyors E and F and upon uprights 213 similar to uprights 200 secured to a saddle 219, which is also attached to the frame M. These boards support the bundles and can be spread apart any desired amount to accommodate tall or short grain, being shown in close position in Fig. 22.

The retarding means for holding the tops of the bundles back as previously described consist of four bent spring fingers 215, yieldingly mounted upon the supports 210 and 211. These fingers turn in as shown in Fig. 1 and engage the tops of the bundles, retarding the same as the shock formed passes out of the machine, thereby in conjunction with the conveyors H and I causing the bundles at the rearward end to lean towards the center. It is to be noted that an elongated shock is formed causing the bundles to lean towards the middle along both sides and the ends thereof.

The method of dumping and dislodging the shock formed, from the machine is accomplished as follows: As before stated the frame M is supported from the frame L. The same is partly supported therefrom by two tension coil springs 216 illustrated in Fig. 15. The upper ends of these springs are secured to the frame members 16 of frame L while the lower portions are secured to hooks 217, attached to the upright portions 45 of the channel frame member 44 of frame M. These springs are of such design that they just permit the loaded frames M and N to easily swing to the ground and rest thereon, with the butts of the bundles in engagement with the ground.

For further supporting the frames M and N a dump mechanism indicated in its entirety at K is provided, which also serves to release the shock after it has been formed, and which is best illustrated in Figs. 3 and 4. To each of the uprights 44 of frame M is attached the hook member 217 previously referred to as holding the end of the spring 216. This member extends upwardly and is bent towards the front of the machine, and has pivoted to it a bell crank 218. The vertex of this bell crank has pivoted to it a link 219 which in turn is pivoted to a bracket 220 which depends from and is attached to the member 20 of frame L. When the bell crank 218 and said link are in alignment as shown in Fig. 3, the mechanism is raised and in position to permit of the formation of shocks thereon. The bell crank 218 is further pivoted to an arm 222 fast on a shaft 223 journalled to the frame L near the forward portion thereof. Altho I have described but a single dump mechanism it can readily be understood that a similar device exists, also operatively connected to the shaft 223 upon the other side of the device. An arm 224 is rigidly secured to the shaft 223. A connecting link 225 is pivoted at one end to the arm 222 and at its other end to an arm 226 which is rigidly attached to a shaft 227. This shaft passes completely thru the tubular support 15 at the front of the machine and has its end bent outwardly at 227, where the same is pivotally connected with a bent rod 228. Rod 228 in turn is pivoted to a foot pedal 229 which is hingedly connected to a portion of the binder proper as shown in Fig. 3.

It is to be noted that when the link 219 and the bell crank 218 are positioned so that the same pass slightly beyond dead center, that the link 225 rests upon the tubular support 15. This holds the parts locked in the relative position shown with the frames M and N in elevated position.

By kicking the pedal 229 backwardly the link 220 and the bell crank 218 are thrown out of alignment and the whole mechanism mounted on frames M and N drop until they take the positions shown in Fig. 4, the dump levers K then releasing the device. In this position it will be noted that center frames M—N is dropped down until it is within a short distance of the ground. A shoe 230 attached to the extreme end thereof drags upon the ground thereby forming a support for said frame when in its dumped position and also serving to limit the downward motion thereof. It is to be noted that the downward motion of frame M is greater than the normal distance between the carriers E and F and the ground. These carriers upon being dumped first strike the ground and as the frame N continues to lower maintain their same relative position. This has the effect relatively speaking of raising the bundles above the boards 211 and 212, and the conveyors E and F so as to disengage the same and partially free the bundles therefrom so that the same may be easily removed from the machine.

In freeing the bundles properly formed into a shock, from the machine the mechanism is first dumped. This drops the carriers E and F to the ground which causes the butts of the bundles which usually project somewhat below the members 161 and 162 to become lodged in the stubble and to so remain. Upon forward movement of the machine the members 161 and 162 which are free at their ends are entirely withdrawn from the shock and the boards 211 and 212 slide from within the space between the two rows of bundles. At the same time the chains 197 and 199 whose prongs 206 may be lodged in the bundles idle along, since the same are only driven by ratchets until said bundles leave the chains and boards and the entire machine is withdrawn from the shock leaving the same erected and intact upon the ground.

To hold the tops of the bundles together while the machine is being withdrawn from the shock I provide a structure shown in detail in Figs. 19 and 20. Two uprights 231 are attached to the M-shaped upright 170. These uprights are bent over at the top and have pivotally secured to them two vertically positioned bars 232. A longitudinally positioned pipe 233 extending thruout the entire length of the machine at the center thereof is rigidly clamped to the bars 232 at the upper portion of the same and are braced thereto by braces 234 and 235. This pipe is further supported by a tall A frame 236 secured at its ends to the uprights 23 of the wheel supported frame L. A stiff arm 237 having a turn-buckle 238 in it is pivoted at one end to the end of said pipe and at its other end to the apex of the A frame 236 and serves to hold the said pipe normally horizontally. In addition to the pipe 233 a similar pipe 239 is employed which is pivotally connected to and hung from the pipe 233 by means of hangers 240. Another arm 241 having a turnbuckle 242 in it similar to the arm 237 is connected to the apex of the A-frame at the same point as said arm 237. With this arrangement the two arms are normally maintained as shown in the drawings in Fig. 19. When the frame M is dumped the pipe 2 tilts with it remaining substantially parallel thereto. At the same time the arm or link 241 pulls up on the end of pipe 239 which causes it and the pipe 233 to approach each other. This has the effect of operating the holding mechanism now to be described.

The holding mechanism for holding the tops of the bundles is shown in Figs. 19 and 20, and comprises a trolley mechanism indicated at Q. A pair of U-shaped plates 242 and 243 are spaced from one another and have pivoted to them a number of grooved rollers 244 which ride upon the pipe 233 thereby forming the trolley structure above referred to. These plates are held spaced at the bottom by a pair of bolts 245 and are provided with levers 248 which extend towards one another and are slidably pivoted to a yoke 249. The yoke 249 carries two rollers 250 which ride upon the pipe 239. When said pipe is moved towards the pipe 233, the yoke 249 is raised causing the arms 247 to swing with it from the position shown in dotted lines to that shown in full lines. Upon the ends of the arms 247 are attached clamp bars 251 which are adapted to engage the bundles at the tops thereof for an extended distance and are provided with prongs 252 adapted to hold the same from slipping. These clamp bars may be resiliently and yieldably attached to the arms 247 as shown in Fig. 20, so that the same engage and clamp the bundles with uniform pressure thruout.

In operation the pipe 333 is adjusted so that it normally inclines toward the front of the machine. This causes the trolley to normally assume the position shown in Fig. 2 where the clamp mechanism is positioned immediately above the center of the shock to be formed. As the pipe 239 is normally in its lowermost position the arms 247 are open as shown in Fig. 20 in dotted lines and the bundles are delivered on the carriers E and F between said open arms. As soon as the machine dumps the pipes 233 and 239 approach each other and the arms 247 are closed in upon each other to clamp the tops of the bundles together. As the machine travels along, the trolley Q being now stationary with the shock travels along the pipes 233 and 239 until it reaches the end thereof. At this point, pipe 233 is spread at 253 which causes the arms 247 to be opened and to release the shock. The machine now leaves the shock intact upon the ground and is withdrawn therefrom. As soon as the machine is again raised, trolley Q resumes its normal position at the forward end of the machine by gravity.

When the installation is used with long grain it sometimes becomes necessary to spread the two rows of bundles apart to make the shock stand up properly. This may be accomplished by a device shown in Fig. 16. Two curved arms 254 and 255 are pivoted to the rear of the frame M, which are adapted to engage the butts of the bundles as the same leave the machine and spread them apart. These arms are connected by links 256 to a central bar 257 by a bolt 258 which may be inserted in a number of holes 259 in said bar to secure any adjustment of the amount of spread desired. This construction may be eliminated if desired where the machine is designed and used only for a particular length of grain.

The advantages of my invention are manifest. An automatic device is provided which effectively forms a shock in an elongated formation and deposits the same upon the ground at the will of the operator, leaving the shock erected and intact. The length and size of the shock can be varied at will, taking care of light and heavy bundles. The device does not require a great amount of power to operate as the bundles are carried along without lifting. The machine when used with a binder serves to aid in balancing the operation of the binder as the same is drawn along the ground.

Having described my invention in the form which I believe represents the best embodiment thereof, I desire to have it understood that the invention can be constructed in other forms and put to other uses than those herein set forth within the scope of the following claims.

Claims:

1. A shocker comprising a frame arranged for support at its forward end upon a binder, wheels supporting the rearward end of said frame, a second frame pivoted to said first frame at a forward portion thereof, extending along said frame and rearwardly beyond the supporting wheels thereof, a receiver at the forward ends of said frames carried by said second frame for receiving the bundles discharged by the binder, a distributer following said receiver, a carrier for supporting the bundles in shock formation, rearwardly positioned relative to said distributer, and a dump mechanism normally holding said second frame supported upon said first frame near the supporting wheels thereof, and adapted to release the shock formed upon said carrier.

2. A shocker comprising a wheel supported frame, a second frame pivoted to said first frame along the forward portion thereof, extending along the same, a receiver mounted upon the forward portion of said second frame a distributer following said receiver, a frame extension pivoted to the rearward end of said second frame near the lowermost portion thereof, a carrier formed on said frame extension for supporting the bundles discharged by said distributer in shock formation, limit stops for holding said frame extension supported relative to said second frame and a dump mechanism for supporting said second frame relative to said wheel supported frame and for lowering the same to bring said frame extension in contact with the ground, said frame extension being movable upon its pivot away from said limit stops to substantially engage the ground throughout its length.

3. A shocker comprising a wheel supported frame, a second frame pivoted thereto and normally raised above the ground, a dumping mechanism for supporting the movable end of said second frame relative to said wheel supported frame and for lowering the same towards the ground, a frame extension attached to the movable end of said second frame normally elevated above the ground and arranged in substantial alignment therewith, means on said frame extension for receiving and supporting bundles in shock formation, means on said second frame for receiving and distributing bundles to said shock forming means, said frame extension being movable upon the lowering of said second frame, to substantially engage the ground throughout its length.

4. A shocker for use in conjunction with a binder delivering bundles in a horizontal position, comprising a frame, a receiver mounted thereon having an upwardly curved bottom, an arm normally extending across said bottom situated near the center of curvature thereof, said arm having a pivot inclining from the vertical away from the curved portion of said bottom and operating in conjunction with said curved bottom to right the bundles.

5. A shocker for use in conjunction with a binder delivering bundles in a horizontal position, comprising a frame, a receiver mounted thereon having an upwardly curved bottom, an arm normally extending across said bottom situated near the center of curvature thereof, a bracket having a vertical pivot, an angle mounted in inclined relation upon said bracket, said arm being pivoted to said inclined angle, and spring means for holding said arm normally in outstanding position.

6. A shocker comprising a wheel supported frame, a second frame pivoted thereto and extending along the same, said second frame having an underslung portion, a frame extension attached to said underslung portion and issuing outwardly therefrom, means on said frame extension for receiving and supporting bundles in shock formation, means on said underslung frame portion for distributing and delivering bundles to said shock forming means, means for receiving and discharging bundles to said distributing means and means for holding said frames in fixed relation.

7. A shocker comprising a wheel supported frame, a second frame pivoted thereto and extending along the same, said second frame having an underslung portion, a frame extension pivoted to said underslung frame portion, means for yieldingly holding said frame extension supported on said second frame in extended position, means on said frame extension for receiving and supporting bundles in shock formation, means on said underslung frame portion for distributing and delivering bundles to said shock forming means, means for receiving and discharging bundles to said distributing means, and a dump mechanism for lowering said second frame and frame extension to release the shock formed thereon, said frame extension moving on its pivot to bring the butts of the bundles in contact with the ground upon engagement with the ground.

8. A shocker comprising a wheel supported frame, means on said frame for supporting two rows of bundles, means for forming the bundles in rows thereon, means for releasing the bundles from said support, and means for grasping the tops of the bundles and holding them together while said bundles are being released, said grasping means being inoperative during the formation of the rows.

9. A shocker comprising a wheel supported frame, a carrier attached to said frame and adapted to be lowered into contact with the ground, means for delivering bundles in two rows upon said carrier, a track positioned above said carrier and extending rearwardly thereof, means for lowering said carrier to bring the same and the butts of the bundles thereof into contact with the ground to permit the withdrawal of said carrier from said bundles, a carriage movable along said track and means thereon for grasping the tops of the bundles and holding them together while said bundles are being released, said carriage moving along said track and remaining fixed relative to said bundles and means at the end of said track for releasing said grasping means.

10. In combination with a binder delivering bundles in a horizontal position, means for raising said bundles on end, a pair of carriers, a distributor for alternately delivering bundles to said carriers to arrange the same in two rows leaning toward one another, means for causing the end bundles in each row to lean toward each other and means for releasing said shock from said carriers.

11. In combination with a binder delivering bundles in a horizontal position, means for raising said bundles on end, an elongated support, means for placing bundles in rows upon said support to form an elongated shock, means for causing said rows of bundles to lean towards each other, means for causing the end bundles in each row to lean towards the center to form a shock and means for releasing said shock from said support.

12. A shocker comprising a longitudinal frame, means for forming an elongated shock thereon, said frame being open at one end and means for lowering said frame to bring said shock in engagement with the ground to permit the withdrawal of said frame from said shock, and means engaging the tops of the shock for holding the same in position during the withdrawal of said frame therefrom.

13. A shocker comprising a wheel supported frame, a carrier attached to said frame and adapted to be lowered into contact with the ground means for delivering bundles in two rows upon said carrier, a track positioned above said carrier and extending rearwardly thereof, means for lowering said carrier to bring the same and the butts of the bundles thereof into contact with the ground to permit the withdrawal of said carrier from said bundles, a carriage movable along said track and means thereon for grasping the tops of the bundles and holding them together while said bundles are being released, said carriage moving along said track and remaining fixed relative to said bundles and means at the end of said track for releasing said grasping means and means actuated by said carrier for automatically returning said carriage to a position above said carrier upon raising said carrier.

14. A shocker comprising a frame a revoluble member mounted thereon said member having a platform and a plurality of radial spokes, two carriers formed on said frame leading up to said revoluble member, means for delivering and depositing bundles upon said platform between said spokes means for alternately rotating said member in opposite directions for delivering bundles from said member to said carriers to form a shock, and means for releasing the shock from said carriers.

15. A shocker comprising an elongated support, means for successively delivering bundles upon said support, means for moving said bundles along said support, means for moving the tops of the bundles at the beginning of the support at a greater rate of speed than the butts, means for retarding the movement of the tops of the bundles at the rear end of the machine to arrange said bundles in a shock, and means for releasing said shock from said support.

16. A shocker comprising a frame, a revoluble member mounted thereon said member having a platform and three radial spokes, two carriers formed on said frame leading up to said revoluble members, means for delivering and depositing bundles upon said platform between said spokes, means for alternately imparting to said revoluble member a third of a revolution in opposite directions, for distributing the bundles to said carriers to form a shock and means for releasing the shock from said carriers.

17. A shocker comprising a frame, a revoluble member mounted thereon said member having a platform and three radial spokes, two carriers formed on said frame leading up to said revoluble member, means for delivering and depositing bundles upon said platform between said spokes, a bevel gear for driving said revoluble member, a shaft extending across said bevel gear bevel pinions freely movable upon said shaft meshing with said bevel gear, a clutch for selectively connecting said pinions with said shaft to drive said revoluble member in opposite directions, and cam means for shifting said clutch to cause the alternate rotation of said member.

18. A shocker comprising a wheel supported frame, means on said frame for supporting two rows of bundles, means for forming the bundles in rows thereon, means for releasing the bundles from said support, and members arranged to engage the top of the bundles on each side of the row while said bundles are being released, said holding members being inoperative during the formation of the rows.

19. A shocker for use in conjunction with a binder delivering bundles in horizontal position comprising a frame, a receiver mounted thereon having an upwardly curved bottom, an arm normally extending across said bottom and pivoted to swing away from the curved portion of said bottom, said arm operating in conjunction with said curved bottom to right the bundles delivered thereto.

20. In combination with a binder delivering bundles in horizontal position, means for raising said bundles on end, a pair of carriers, a revoluble member positioned in advance of said carriers, means for delivering bundles upon said revoluble member, said revoluble member being adapted to alternately discharge said bundles to said carriers, and means for operating said revoluble member to cause the same to alternately discharge the bundles upon said carriers, said operating means being timed to operate in unison with the delivery of the bundles from said binder.

In testimony whereof I affix my signature.

HERBERT E. WUNDERLICH.